(12) United States Patent
Barere

(10) Patent No.: US 6,675,527 B1
(45) Date of Patent: Jan. 13, 2004

(54) ENCLOSED PEST CONTROL DEVICE

(76) Inventor: George N. Barere, c/o Sono Manufacturing Company, Inc., 2 Merritt Pl., Norwalk, CT (US) 06854

( * ) Notice: Subject to any disclaimer, the term of this patent is extended or adjusted under 35 U.S.C. 154(b) by 0 days.

(21) Appl. No.: 10/047,348

(22) Filed: Jan. 14, 2002

(65) Prior Publication Data (65)

(51) Int. Cl.⁷ .............................................. A01M 1/14
(52) U.S. Cl. ........................ 43/114; 43/121; 43/132.1; 43/136; 264/553; 264/160; 264/297.8
(58) Field of Search .................... 43/114, 121, 132.1, 43/136; 264/553, 554, 157, 160, 297.8

(56) References Cited

U.S. PATENT DOCUMENTS

| | | | |
|---|---|---|---|
| 1,669,974 A | | 5/1928 | Cummins |
| 2,618,882 A | * | 11/1952 | Martin ......................... 43/136 |
| 3,022,614 A | * | 2/1962 | Dreyfus et al. ............... 53/442 |
| 3,303,600 A | * | 2/1967 | Freeman ....................... 43/131 |
| 3,577,700 A | * | 5/1971 | Bippus et al. ................ 53/453 |
| 3,771,938 A | * | 11/1973 | Pinto et al. .............. 425/174.4 |
| 3,986,808 A | * | 10/1976 | Keith ......................... 425/370 |
| 4,161,079 A | | 7/1979 | Hill |
| 4,169,531 A | * | 10/1979 | Wood .......................... 206/531 |
| 4,216,860 A | * | 8/1980 | Heimann .................... 206/364 |
| 4,385,465 A | | 5/1983 | Palmeri |
| 4,395,842 A | * | 8/1983 | Margulies .................... 43/114 |
| 4,499,353 A | * | 2/1985 | Shields ....................... 206/470 |
| 4,563,836 A | * | 1/1986 | Woodruff et al. ............. 43/131 |
| 4,656,722 A | * | 4/1987 | Armstrong ................. 29/527.2 |
| 4,778,372 A | * | 10/1988 | Mutti et al. .................. 425/294 |
| 4,782,621 A | * | 11/1988 | Wissman ...................... 43/131 |
| 4,793,093 A | * | 12/1988 | Gentile ......................... 43/131 |
| 4,823,506 A | | 4/1989 | Demarest |
| 4,837,969 A | * | 6/1989 | Demarest ...................... 43/131 |
| D306,895 S | * | 3/1990 | Mares ........................ D22/122 |
| 5,048,225 A | * | 9/1991 | Brandli ......................... 43/131 |
| D326,890 S | | 6/1992 | Mares |
| 5,122,328 A | * | 6/1992 | Anderson .................... 264/554 |
| D346,199 S | | 4/1994 | Spragins |
| D362,045 S | | 9/1995 | Demarest |
| 5,528,854 A | * | 6/1996 | Antonali et al. ............... 43/131 |
| D390,305 S | | 2/1998 | Dickson |
| 5,771,628 A | * | 6/1998 | Nobbs .......................... 43/121 |
| 5,802,761 A | * | 9/1998 | Demarest et al. ............. 43/121 |
| 5,983,558 A | * | 11/1999 | Las et al. ...................... 43/131 |
| 6,056,531 A | * | 5/2000 | Furuya et al. ............ 425/302.1 |
| 6,207,100 B1 | * | 3/2001 | Weiss et al. .............. 220/366.1 |

* cited by examiner

Primary Examiner—Charles T. Jordan
Assistant Examiner—Bret Hayes
(74) Attorney, Agent, or Firm—Seth Natter; Natter & Natter

(57) ABSTRACT

An enclosed pest control device includes a covered tray carrying a tacky glue, bait, etc. The cover is vacuum formed of a transparent thermoplastic sheet and includes an open ended igloo vestibule which leads to the interior. During manufacture, the vestibule open end is formed by cutting the vestibule in a plane transverse to the plane of the tray, without a backing support. An array of covers is formed of a single sheet with continuous vestibules joining the ends of adjacent covers in a row such that a single cut through each vestibule will form two open ended vestibules without wasted material.

22 Claims, 6 Drawing Sheets

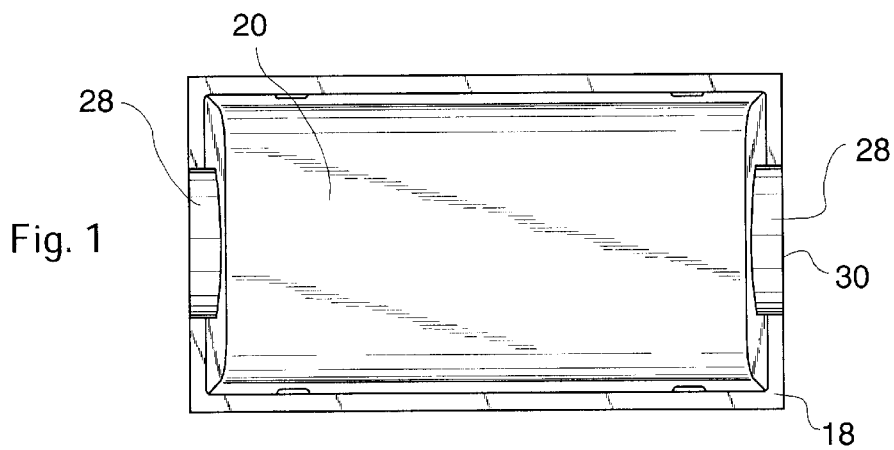
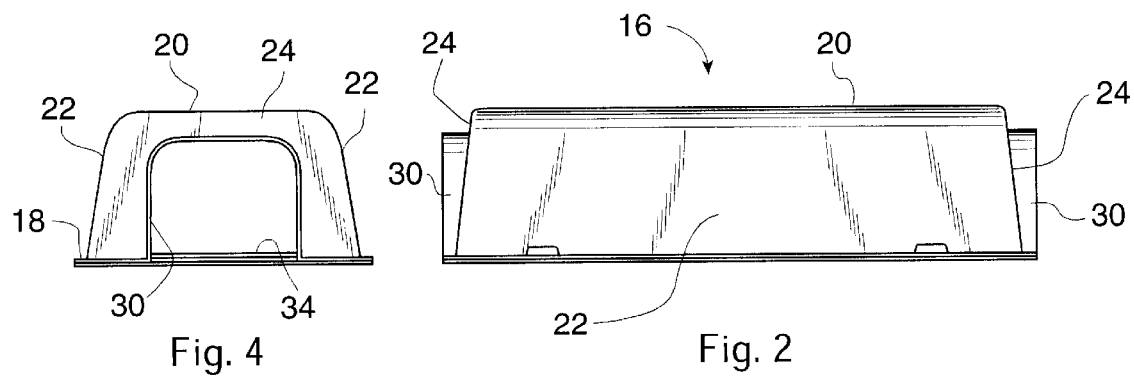
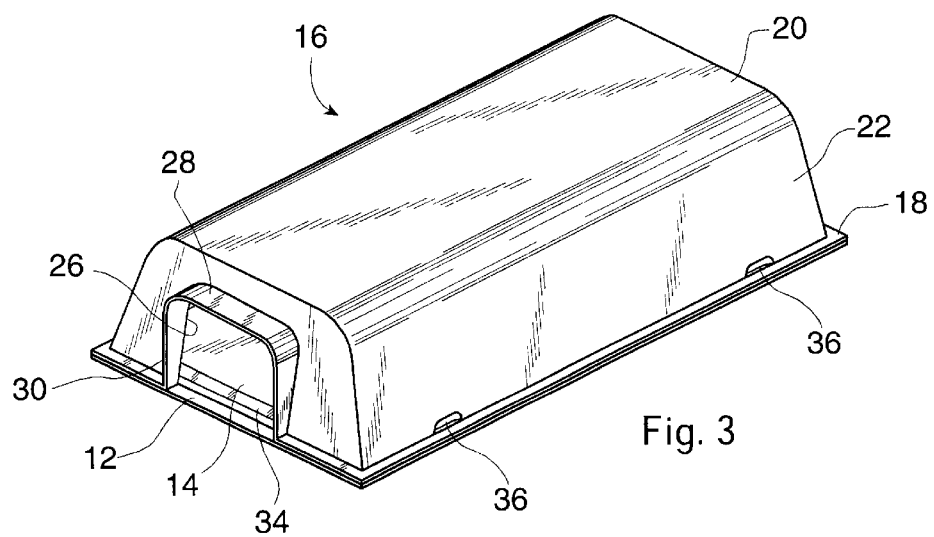

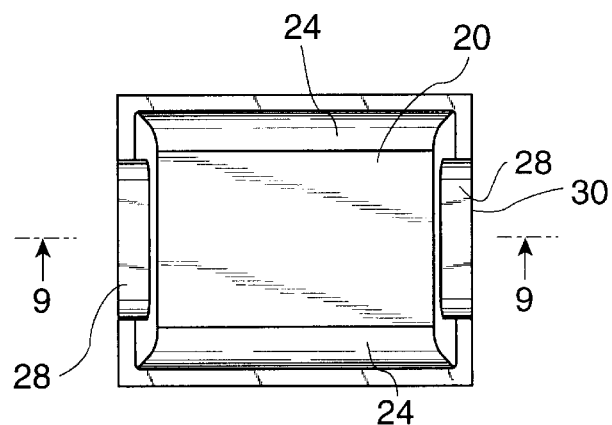
Fig. 5
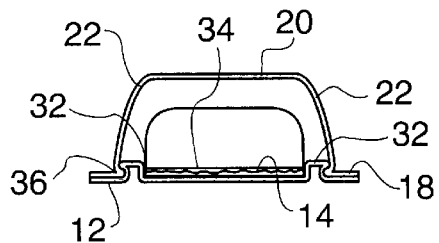
Fig. 7
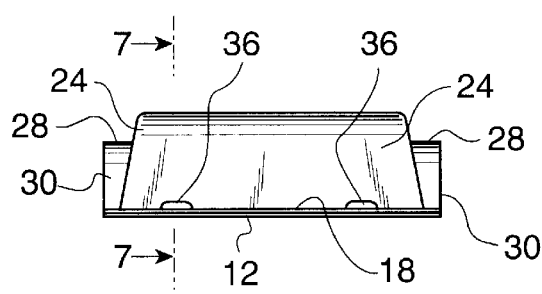
Fig. 6
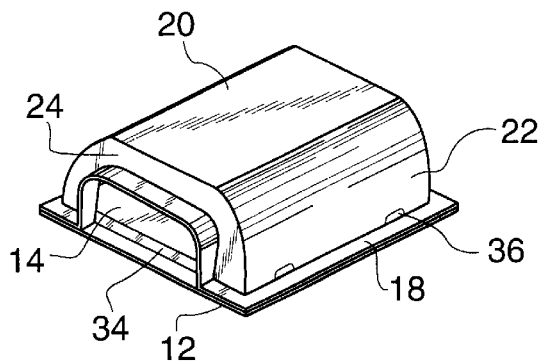
Fig. 8
Fig. 9

Fig. 17
Fig. 18
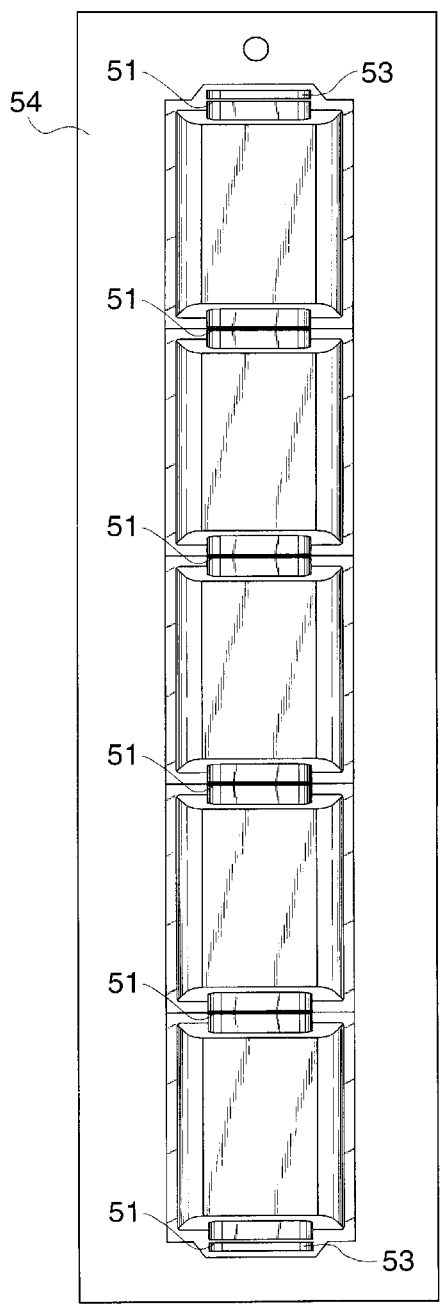
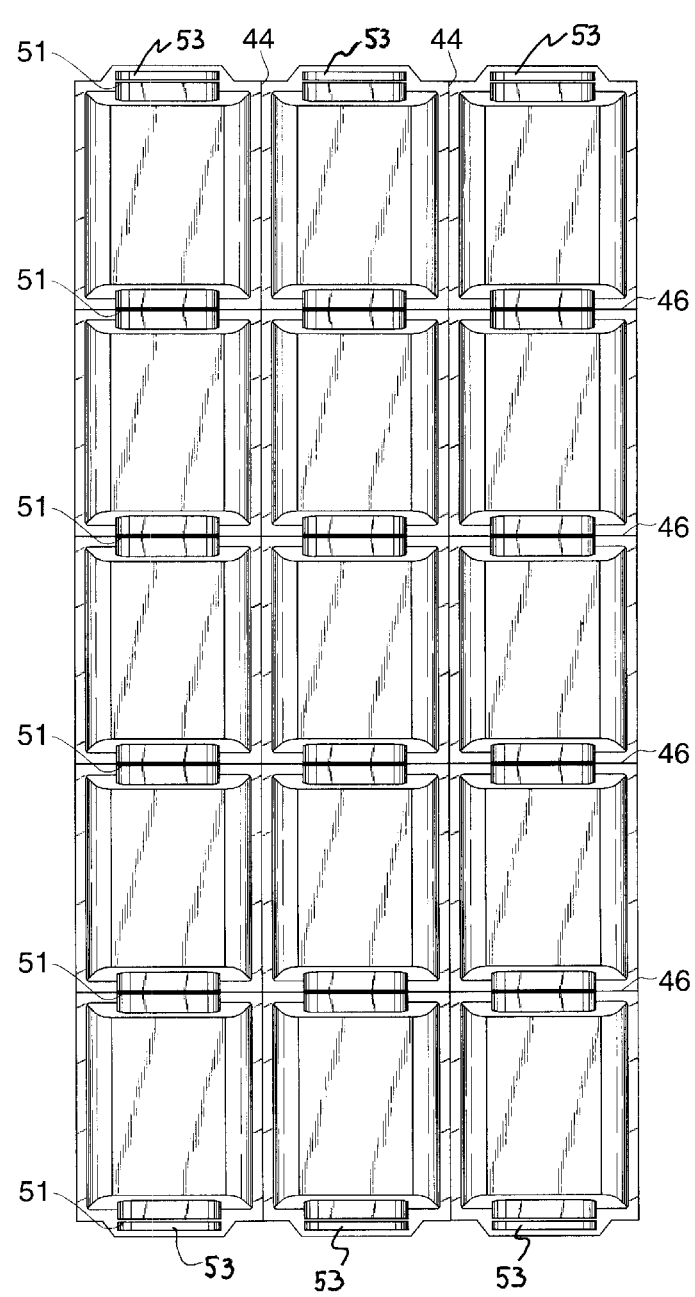

ENCLOSED PEST CONTROL DEVICE

BACKGROUND OF THE INVENTION

1. Field of the Invention

This invention relates generally to pest control devices and more particularly to disposable glue traps and bait stations.

2. Antecedents of the Invention

Glue traps have been recognized as an effective means of pest control in both professional and consumer markets. Most glue traps comprised a plastic tray or cardboard sheet upon which a layer of permanently tacky glue was applied. When strategically placed on floors adjacent walls, for example, they have been found to be quite effective. Unlike spring snap mouse or rat traps, glue traps enabled a target pest to be caught and disposed without gore.

Consumers, however, found it distasteful to lift and remove a trap with a captured pest adhered to the tacky glue. A mouse or rat, for example, either dead or alive, appeared abhorrent to consumers who were loath to touch the rodent from a hygienic as well as psychological perspective.

A further drawback was that after a period of time, dust accumulated on the surface of the glue, which rendered the glue less adherent and the trap eventually became ineffective.

A proposed solution to these problems was the suggestion of placing a cover over the tacky surface of a glue trap. It was anticipated that a captured pest would thus be shielded from view, and the trap could be grasped and lifted by the cover itself for disposal. Examples of proposed covered glue traps are illustrated in U.S. Pat. No. 4,161,079 issued to Hill and U.S. Des. Pat. No. 346,199 issued to Spragins. It is unknown whether the devices disclosed in U.S. Pat. No. 4,161,079 was ever commercialized. In any event, these devices certainly did not gain widespread consumer approval.

A major factor in the lack of commercial success of the Hill and Spragins devices was that they were relatively difficult and somewhat expensive to manufacture. Manufacturing costs may have been prohibitive or the end product cost so high that the product's advantages did not merit its cost.

A significant factor in manufacturing the device illustrated in U.S. Des. Pat. No. 346,199 was that either the cover was required to be injection molded, entailing relatively expensive die costs as well as a significant material thickness. If the cover was fabricated of vacuum formed thermoplastic sheet material with concomitant reduced mold costs and material thickness, the access openings in the end walls of the cover were required to be punch cut or die cut in an axial direction, i.e. within a plane parallel to the tray of the trap. Since the thickness of the end wall in a deeply drawn vacuum formed cover was but minimal, if the access openings were to be punch cut or die cut, the end wall would deform and/or tear, unless a back support platen or core was provided during the cutting operation.

There have also been proposed cardboard tent type covered glue traps. These devices were unsuitable for use in damp or wet environments and required assembly involving folding, bending or other manipulation of the cardboard by the consumer. Further, cardboard fabrication was relatively slow and costly.

SUMMARY OF THE INVENTION

A glue trap or bait station includes a vacuum formed thermoplastic cover which is secured over a tray. The tray carries a permanently tacky glue layer or a pest control bait, pesticide, etc. The cover includes at least one portal which is dimensioned and positioned such that a target pest will be able to pass through the portal and be accommodated within the interior.

The portal is formed in at least one end wall of the cover and an igloo entranceway vestibule extends outwardly from the portal. During manufacture, an open end of the vestibule is formed by cutting the vestibule with, for example, a saw, hot knife, laser, etc. in a transverse plane, i.e. a plane which intersects the plane of the tray, without supporting the vestibule.

Multiple covers may be formed on a single vacuum formed sheet, with a continuous vestibule joining the ends of adjacent covers so that a single cut at the midspan of a continuous vestibule will form two open ended vestibules without waste material.

From the foregoing compendium, it will be appreciated that it is an aspect of the present invention to provide an enclosed pest control device of the general character described which is not subject to the disadvantages of the antecedents of the invention aforementioned.

A feature of the present invention is to provide an enclosed pest control device of the general character described which is well suited for economical mass production fabrication.

It is a consideration of the present invention to provide an enclosed pest control device of the general character described which is low in cost.

To provide an enclosed pest control device of the general character described which protects against dust accumulation on glue surfaces is a further aspect of the present invention.

Another aspect of the present invention is to provide an enclosed pest control device of the general character described which is easy to use.

An additional feature of the present invention is to provide an enclosed pest control device of the general character described which is ready to use without assembly being required.

Another consideration of the present invention is to provide an enclosed pest control device of the general character described which is well adapted to manufacture by unskilled personnel.

To provide an enclosed pest control device of the general character described which is manufactured in arrays of multiple units with interior surfaces inaccessible until individual units are separated from the array is a further consideration of the present invention.

A further feature of the present invention is to provide an enclosed pest control device of the general character described which may be fabricated by vacuum forming from relatively thin thermoplastic sheets with minimal waste.

To provide a method of economically manufacturing enclosed pest control devices of the general character described is a further aspect of the present invention.

An additional consideration of the present invention is to provide an enclosed pest control device of the general character described wherein access openings are cut without the necessity of supporting the material being cut.

Yet a further aspect of the present invention is to provide an enclosed pest control device of the general character described which exploits the phenomenon that pests migrate to dark interior spaces.

A still further feature of the present invention is to provide an enclosed pest control device of the general character described which is efficient in operation.

To provide an enclosed pest control device of the general character described which eliminates the possibility of touching a captured pest during disposal is an additional consideration of the present invention.

To provide an enclosed pest control device of the general character described which is environmentally sound is a further aspect of the present invention.

Another consideration of the present invention is to provide an enclosed pest control device of the general character described which efficiently employs materials of minimal thickness for components which are not subject to significant loads or stress.

Yet another consideration of the present invention is to provide an enclosed pest control device of the general character described which is manufactured in arrays of multiple interconnected units suitable for bulk sale to the trade without packaging.

Other aspects, features and considerations of the present invention in part will be obvious and in part will be pointed out hereinafter.

With these ends in view, the invention finds embodiment in the various arrangements of parts, combinations of elements and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown some of the various exemplary embodiments of the invention:

FIG. 1 is a top plan view of an enclosed pest control device constructed in accordance with and embodying the invention configured as a glue trap for mice and including a cover joined to a tray carrying permanently tacky glue, FIG. 2 is a front elevational view thereof showing a vestibule extending outwardly from a portal in each end wall, FIG. 3 is a perspective view thereof illustrating an open end of a vestibule through which a target pest enters, FIG. 4 is an end view thereof looking axially through the vestibule, FIG. 5 is a top plan view of the enclosed pest control device in accordance with the invention, configured as an insect trap, FIG. 6 is a front elevational view thereof, showing vestibules projecting outwardly from each end wall, FIG. 7 is a transverse sectional view, the same being taken substantially along the plane 7—7 of FIG. 6 and illustrating a snap fit engagement between a cover and a tray, FIG. 8 is a perspective view of the insect trap, FIG. 9 is a longitudinal sectional view through the insect trap tray, the same being taken substantially along the plane 9—9 of FIG. 5 with the cover omitted to better illustrate the tray, FIG. 17 is a top plan view of a single row of enclosed pest control devices stripped from an array and mounted to a card for retail sale, and FIG. 18 is a top plan view of an array of completed pest control devices suitable for bulk sale to the trade without further packaging.

DESCRIPTION OF THE PREFERRED EMBODIMENTS

Figure 10:
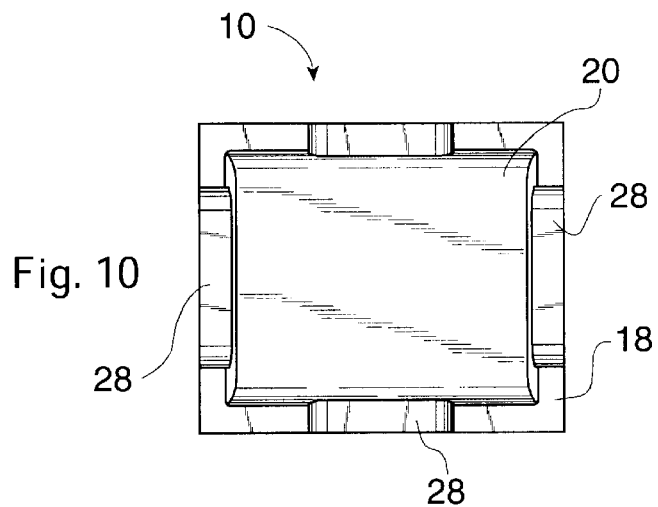
FIG. 10 is a top plan view of a pest control device in accordance with the invention configured as an insect bait station, with vestibules projecting outwardly from end walls and side walls.
Figure 11:
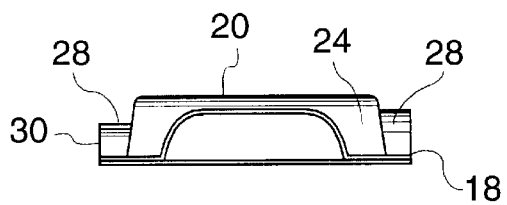
FIG. 11 is a side view thereof.
Figure 12:
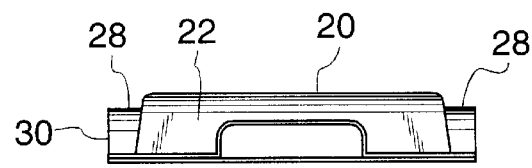
FIG. 12 is a front elevational view thereof.
Figure 13:
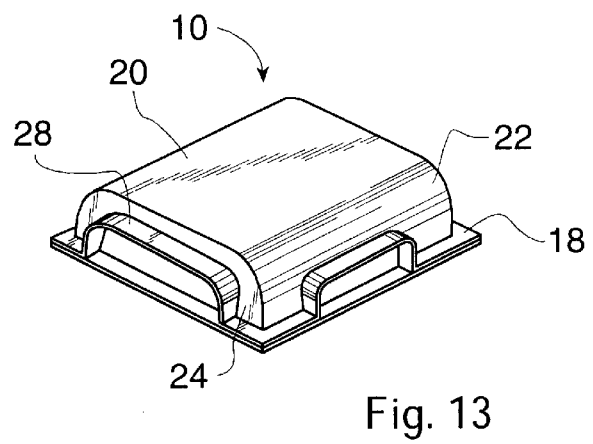
FIG. 13 is a perspective view thereof.

Referring now in detail to the drawings, the reference numeral 10 denotes generally an enclosed pest control device constructed in accordance with and embodying the invention, configured and dimensioned in the shape of a mouse trap, by way of example only. The pest control device 10 comprises a generally planar base or tray 12 having a coating or layer of permanently tacky adhesive 14 which is spread across the surface thereof, except for a marginal area.

In accordance with the invention, the device is assembled with an enclosure or a cover 16 formed of lightweight thin walled thermoplastic. The cover 16 includes a planar peripheral flange 18 substantially in abutting contact with the marginal area of the tray 12. The cover 16 includes a substantially planar top panel 20, having curved side edges extending to generally planar, downwardly diverging side walls 22. Generally planar downwardly diverging end walls 24 are provided at the ends of the top panel 20. At the tray of the side and end walls, is the peripheral flange 18.

The side and end walls are so dimensioned as to support the top panel 20 at an elevation sufficient to provide an interior height to accommodate the target pest. If the target pest is larger than a mouse, for example, a rat, the cover and tray would be appropriately dimensioned.

In accordance with the invention, an access portal 26 is provided in at least one of the end walls 24. Surrounding each portal 26 and projecting outwardly from the end wall 24 is an igloo entranceway vestibule 28, having an open end 30, through which the target pest enters. The open end 30 is defined by a substantially planar edge surface, as viewed in FIGS. 2 and 3. When viewed in the direction of FIG. 4, i.e. transverse to the planes of the tray 14 and peripheral flange 18, the open end edge surface is seen to have the thickness of the vestibule wall.

A plurality of covers in an array of successive rows of covers are vacuum formed of a single sheet of thermoplastic. Each row comprises a group of end to end aligned covers with the end walls of adjacent covers being spaced from one another a minimal distance and joined by a common hollow vestibule having a length twice the length of an individual vestibule.

As such, discrete covers may be formed by cutting the common vestibules along a plane which intersects with the plane of the tray or peripheral flange 18, without supporting the common hollow vestibule from beneath, as will be more particularly described hereinafter.

FIGS. 5 through 8 illustrate the covered pest control device 10 proportioned and dimensioned in a slightly different format wherein the length, width and height dimensions are such as to be configured as a glue trap for insect pests. Identical numeral designations have been employed in the drawing figures as employed with respect to the corresponding components of the mouse glue trap configuration of FIGS. 1 through 4.

It will be noted from FIGS. 7 and 9, that the tray 12 may be formed of a generally planar sheet of thermoplastic and may include parallel longitudinal raised ledges 32 the outer surface of which abut the interior of the side walls 22 of the cover. The tray 12 may additionally include transverse raised end ledges 34 which may abut the interior of the end walls 24 of the cover. The raised ledges 32, 34 define the area on which the permanently tacky adhesive 14 is carried and also define the marginal adhesive free area.

It should also be noted that indentations 36 may be provided at spaced locations on the juncture of the side panels 22 and the peripheral flange 18 and that the registered areas of the longitudinal raised portions 32 may be similarly undercut so as to provide a snap fit engagement between the cover and the tray, as depicted in FIG. 7.

A further configuration of the pest control device 10, in the form of an insect bait station is depicted in FIGS. 10 through 13. It should be noted in this configuration, there are proportional changes between the size of the access portals and vestibules as compared with the height and width of the side walls 22 and end walls 24. Additionally, one or more side walls includes an access portal and corresponding vestibule.

Figure 14:
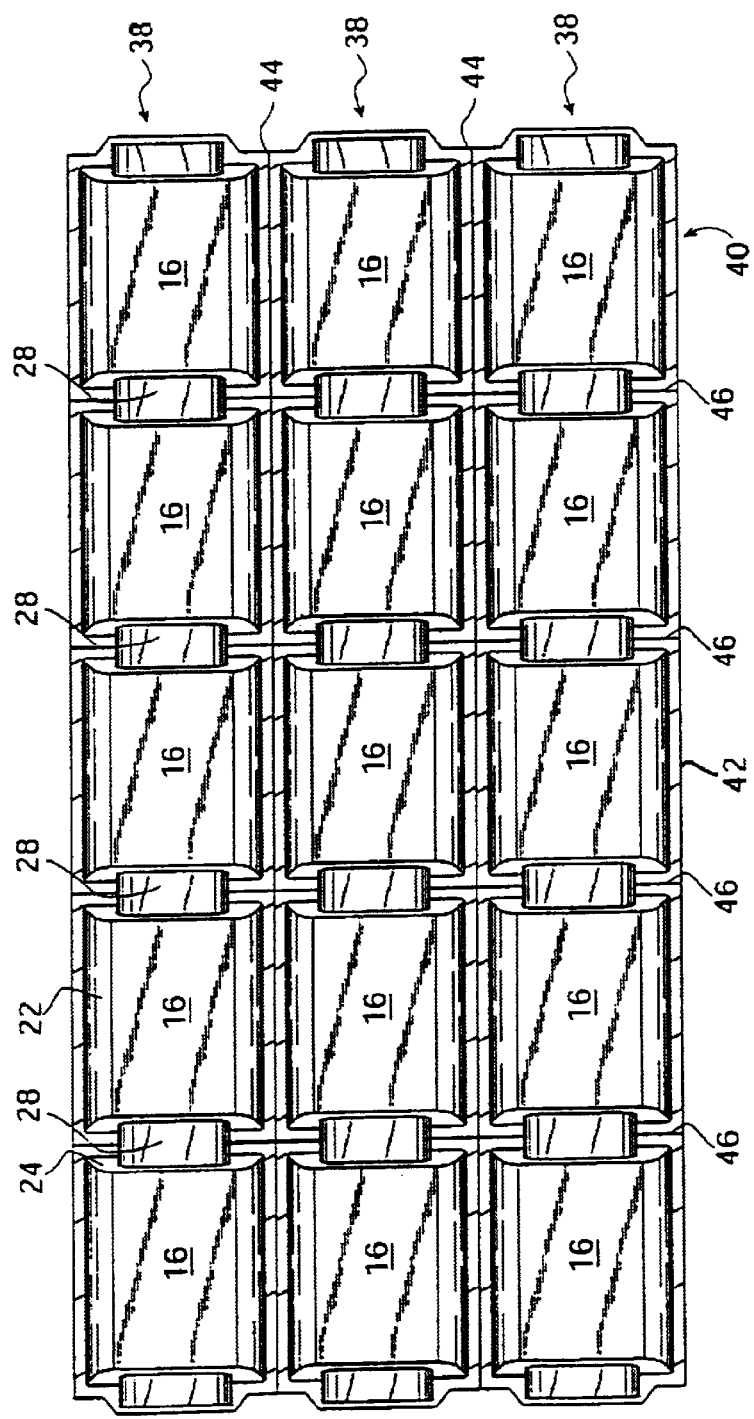
FIG. 14 is a top plan view of an array of rows of partially completed covers as vacuum formed from a single sheet of thermoplastic.
Figure 15:
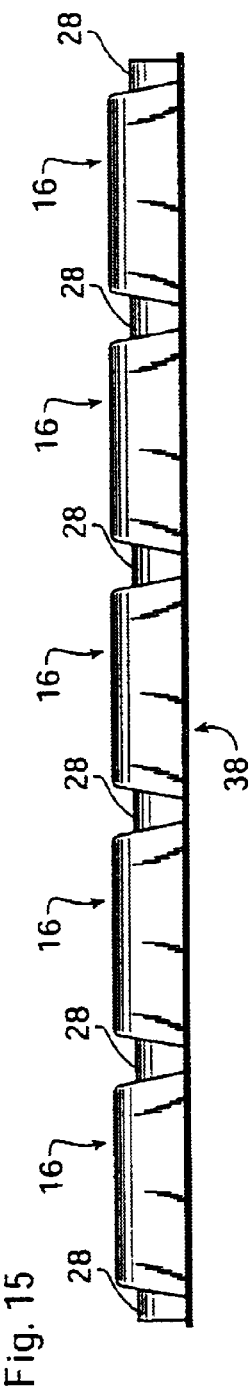
FIG. 15 is a front elevational view of a row in the array.

FIG. 14 illustrates a plurality of partially completed covers which have been stripped from a single sheet of thermoplastic subsequent to a vacuum forming operation. By way of example only, an array 40 of partially completed covers may comprise successive rows 38 of five partially completed covers, with the array 40 being bordered by a cut edge 42. Partially die cut lines 44 and 46 facilitate separation of individual completely formed covers, or completed devices from one another. It should also be noted that the facing ends 24 of adjacent partially completed covers of each row 38 are joined by a continuous hollow vestibule 28. While the covers at the ends of each row 38 have vestibules extending from their outer facing end walls, such vestibules have closed ends.

In accordance with the invention, the manufacturing process includes forming individual covers by cutting the continuous vestibules, substantially at their midlength, and cutting the closed end vestibules to match the length of cut continuous vestibules. The cutting planes intersect the plane of the tray 12 or the peripheral flange 18 and are preferably perpendicular to the plane of the tray or peripheral flange.

Figure 16:
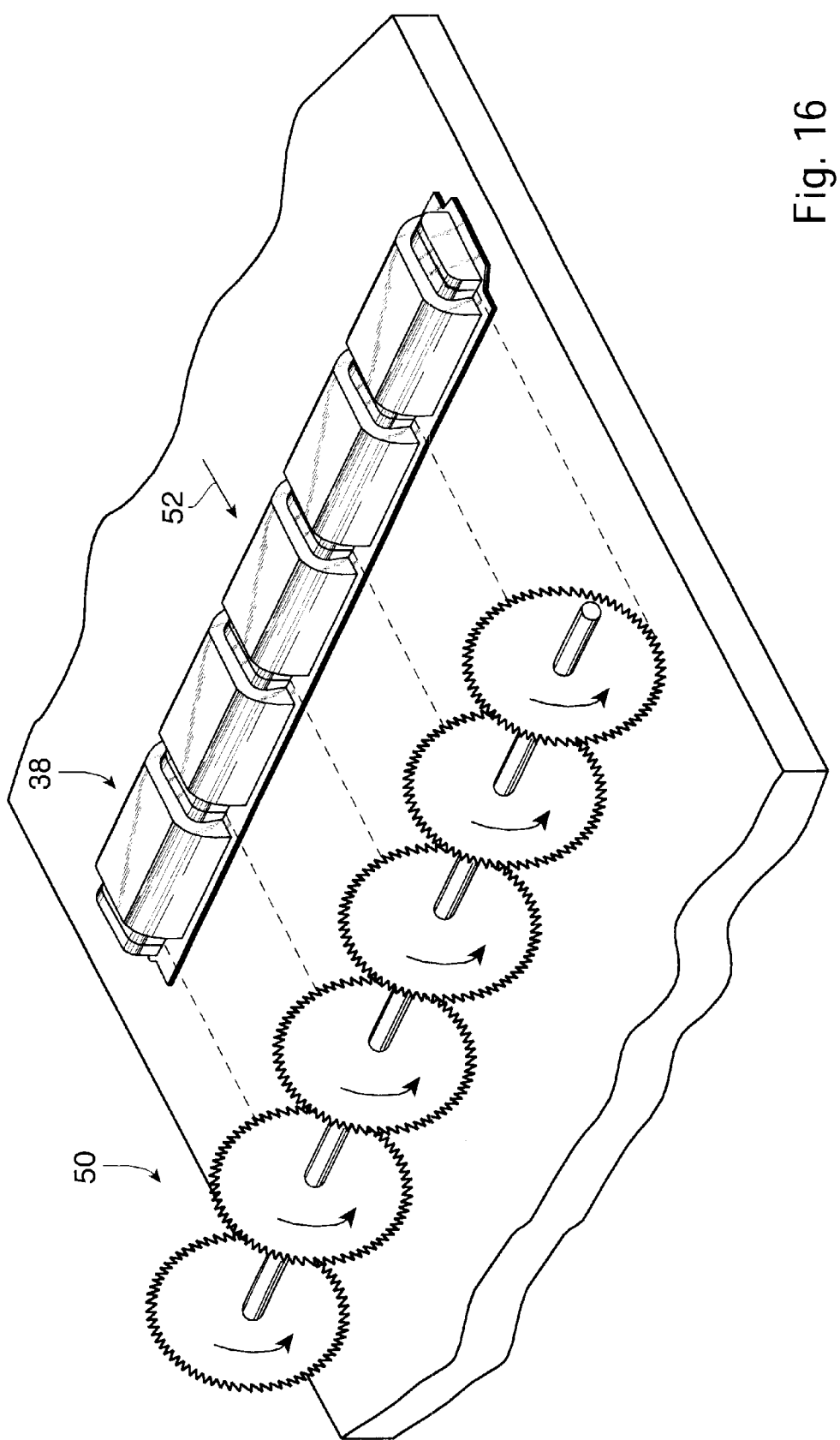
FIG. 16 is a schematized perspective view of a step during the process of manufacturing the pest control devices in accordance with the invention wherein one or more arrays are simultaneously formed into covers by cutting through vestibules which join the end walls of adjacent covers in each row.

During assembly, a corresponding array of trays 12 having tacky adhesive 14 is registered with the array 40 of covers 16 and are joined together at the peripheral flange 18 by adhesive, solvent, heat and pressure or snap fit engagement of the indentations 36 and undercut portions of the ledges 32. It should be understood that the corresponding array of trays is partially die cut to separate individual trays from the remaining trays along lines registered with the partially die cut lines, 44, 46 of the cover array 40. Thereafter, multiple arrays of assembled trays 12 and covers 16 are positioned along an assembly line and advanced into a cutting station 50 as illustrated in FIG. 16 without providing any backing support for the vestibules.

If desired, the arrays 40 may be fed through the cutting assembly 50 prior to attaching the covers on the trays.

The cutting station 50 may comprise a plurality of circular saws, for example, with each circular saw being positioned in registration with the midspan of a connecting vestibule, with the exception of the vestibules of the first and last covers in each row 38.

With respect to such end vestibules, the circular saws are registered to transversely cut through the vestibules such that all vestibules will be of substantially the same length.

The feed direction of arrays 40 in the assembly line is depicted by the heavy arrow 52 in FIG. 16. In lieu of advancing arrays toward a fixed cutting station 50, the cutting station may be advanced into the arrays.

It should also be appreciated that the depth of cut is adjusted such that the cut is completed only through the continuous vestibules whereby individual enclosed pest control devices 10 may be removed by being separated from one another along the partially die cut lines extending through the covers and trays.

FIG. 18 illustrates an array 40 after being removed from the cutting station 50 and showing previously continuous vestibules separated into individual open ended vestibules by cut pathways 51. The pathways 51 through the outer end vestibules leave remaining closed end cap 53.

The pest control devices 10 may then be separated for packaging of one or more units in boxes for example, or may be sold, to the trade, as is, with the array comprising its own bulk pack. The interior glue surfaces remain dust free, since all vestibule open ends 30, including those of the end vestibules, are inaccessible, except through the cut passageways.

In FIG. 17 there is illustrated a single row 38 of devices after completing the cutting operation attached to a display card for retail sale, with the consumer separating individual units from the row 38, as needed.

In lieu of employing molded thermoplastic trays, a paperboard card can be utilized and the tacky adhesive 14 may be applied to discrete areas of the card, rather than mounting traps having trays to the card 54. Individual units may be separated along perforation lines in the paperboard, registered with the partially die cut lines 46 and with the longitudinal edges of the peripheral flanges 18.

It should be understood that the trays and covers need not be rectangular or square in plan view and any of a number of geometric shapes may be utilized for the device, such as cylindrical or a spherical section, i.e. an igloo shape.

Thus it will be seen that there is provided an enclosed pest control device which achieves the various aspects, features and considerations of the present invention and is well adapted to suit the conditions of practical usage.

Since various possible embodiments might be made of the present invention and various changes might be made in the exemplary embodiment set forth herein, it is to be understood that all matter herein described or shown in the accompanying drawings is to be interpreted as illustrative and not in a limiting sense.

Having thus described the invention there is claimed as new and desired to be secured by Letters Patent:

1. A method of fabricating an enclosed pest control device comprising a substantially planar base and a cover fitted over the base, the method comprising the steps of:
   a. vacuum forming the cover; and
   b. cutting the cover in a direction transverse to the plane of the base in the absence of a backing support to form an access opening.

2. A method of fabricating an enclosed pest control device in accordance with claim 1 wherein the cover includes a top, side walls and end walls, at least one end wall including a vestibule projecting outwardly therefrom, the step of cutting including cutting the vestibule, the access opening comprising an open end of the vestibule.

3. An enclosed pest control device fabricated in accordance with claim 2.

4. A method of fabricating an enclosed pest control device in accordance with claim 1 further including the steps of:

providing a base comprising a tray carrying a tacky adhesive, and fitting the cover over the base before cutting the cover.

5. A method of fabricating an enclosed pest control device in accordance with claim 1 further including the steps of:

providing a base comprising a tray, and fitting the cover over the base.

6. An enclosed pest control device fabricated in accordance with claim 1.

7. A method of fabricating an enclosed pest control device, the device comprising a base and a cover joined to the base, the cover having a top, side walls and end walls, at least one vestibule extending outwardly from at least one wall, the vestibule being defined by a vestibule wall, the method comprising the steps of:

a) vacuum forming a cover from a sheet of thermoplastic, b) providing a base, c) joining the cover to the base, and d) cutting the vestibule wall in the absence of backing support to form an open end, the open end of the vestibule defining an opening for target pest access.

8. An enclosed pest control device as fabricated in accordance with claim 7 wherein the vestibule extends outwardly from an end wall.

9. A method of fabricating an enclosed pest control device in accordance with claim 7 wherein the step of providing base comprises a tray carrying a tacky adhesive.

10. A method of fabricating covers for an enclosed pest control device, the covers comprising a top portion and a wall extending downwardly therefrom, the cover additionally including a vestibule projecting outwardly from a portion of the wall, the method comprising:

a. vacuum forming at least two adjacent covers joined by a common hollow vestibule from a sheet of thermoplastic material, and b. cutting the common hollow vestibule in the absence of a backing support along a plane transverse to the plane of the sheet.

11. A method of fabricating covers for an enclosed pest control device in accordance with claim 10 wherein a row of several covers are vacuum formed from a single sheet with adjacent covers joined to one another by common hollow vestibules, the step of cutting comprising simultaneously cutting all of the common hollow vestibules.

12. A method of fabricating covers for an enclosed pest control device in accordance with claim 10 wherein the step of cutting is performed utilizing a saw.

13. An array of partially completed pest control devices, the array being vacuum formed of a sheet of thermoplastic, the array comprising at least two partially completed covers, each cover comprising a top portion a wall portion and a peripheral flange, the wall portion extending from the top portion to the peripheral flange, the sheet being partially cut along lines defining the peripheral flange of each partially completed cover, the array further comprising a common hollow vestibule extending between facing wall portions of each partially completed cover.

14. An array of partially completed pest control device covers as constructed in accordance with claim 13 further including at least two vacuum formed trays, one of the trays being connected to the underside of each partially completed cover, the trays being joined to one another along partially cut lines defining the periphery of each tray, the partially cut lines defining the peripheral flange and the partially cut lines defining the periphery of each tray being registered with one another.

15. An array as constructed in accordance with claim 14 wherein the common hollow vestibule is cut along a plane transverse to the peripheral flange to form separate open ended vestibules extending from each cover.

16. An array as constructed in accordance with claim 15 wherein the plane is at the midlength of the common hollow vestibule, whereby production waste is minimized.

17. An array of partially completed pest control device covers as constructed in accordance with claim 13 wherein the array comprises a plurality of partially completed covers positioned in a row, adjacent partially completed covers of the row being interconnected by common hollow vestibules.

18. An array of partially completed pest control device covers as constructed in accordance with claim 17 wherein facing wall portions of each partially completed cover in a row are interconnected by common hollow vestibules.

19. An array of partially completed pest control device covers as constructed in accordance with claim 18 further including closed end hollow vestibules extending from outwardly facing wall portions of the partially completed covers at the ends of the row.

20. A method of fabricating pest control device from the array of partially completed pest control device covers as constructed in accordance with claim 19 comprising simultaneously cutting the common hollow vestibules and the closed end vestibules in planes transverse to the peripheral flange to form separable pest control devices.

21. An array of pest control device covers as constructed in accordance with claim 15 wherein the array comprises a plurality of partially completed covers positioned in a row facing wall portions of each partially completed cover in the row being interconnected by common hollow vestibules, the array further including closed end hollow vestibules extending from outwardly facing wall portions of the partially completed covers at each end of the row, the common hollow vestibules and the closed end vestibules being cut in planes transverse to the peripheral flange, the cut through each closed end vestibule forming a closed end cap, the trays carrying a tacky adhesive, whereby a multiple package of ready to use glue traps is provided, with each glue trap being separable from the remainder of the glue traps along the partially cut lines, the tacky adhesive being protected from dust contamination by the top portion, wall portion and vestibules of each cover and the closed end caps of the covers at the ends of the row, without the necessity of additional packaging.

22. A ready to use glue trap, the glue trap being separated from the multiple package constructed in accordance with claim 21 along the partially cut lines.

* * * * *